UNITED STATES PATENT OFFICE.

WALDRON J. CHEYNEY, OF WALLINGFORD, AND E. T. DIETERICHS, OF PHILADELPHIA, PENNSYLVANIA.

IMPROVED METHOD OF CONSOLIDATING COAL-DUST, PEAT, &c.

Specification forming part of Letters Patent No. 46,777, dated March 14, 1865.

*To all whom it may concern:*

Be it known that we, WALDRON J. CHEYNEY, of Wallingford, Delaware county, Pennsylvania, and E. T. DIETERICHS, of Philadelphia, Pennsylvania, have invented an Improved Mode of Consolidating Coal-Dust, Peat, and Similar Substances; and we do hereby declare the following to be a full, clear, and exact description of the same.

Our invention consists in mixing with coal-dust or peat an aqueous solution of silica, and drying the mixture, the particles of coal-dust and peat being firmly held together by the silica, so as to form a hard mass, which is not affected by moisture, and which answers as an efficient substitute for ordinary coal.

In order to enable others to apply our invention, we will now proceed to describe the manner in which it is carried into effect.

The coal-dust, peat, or similar substance to be consolidated is first thoroughly dried, and then intimately mixed with such a quantity of an aqueous solution of silica (as free from alkali as possible) as is necessary to bring the whole to a pasty consistency. The mixture may then be introduced into suitable molds, compressed, and dried. After the mixture has become thoroughly dry it will be found that the particles of coal-dust or peat are held firmly together by the silica, and that the mixture is thus rendered as solid as necessary for handling and transportation. When so consolidated the mixture is not affected by moisture, and burns freely without odor and without prematurely crumbling or breaking.

Although we have alluded to a solution of silica only, it will be apparent that solutions of substances containing silica—feldspar, for instance—may be substituted for the same.

We claim as our invention and desire to secure by Letters Patent—

Consolidating particles of coal, peat, and similar substances by mixing with the same an aqueous solution of silica and drying and compressing the mixture, substantially as specified.

In testimony whereof we have signed our names to this specification in the presence of two subscribing witnesses.

WALDRON J. CHEYNEY.
E. T. DIETERICHS.

Witnesses:
CHARLES E. FOSTER,
W. J. R. DELARRY.